US010444092B2

(12) United States Patent
Pollard et al.

(10) Patent No.: US 10,444,092 B2
(45) Date of Patent: Oct. 15, 2019

(54) UPSTREAM NOZZLE SENSOR FOR INJECTION MOLDING APPARATUS AND METHODS OF USE

(71) Applicant: IMFLUX INC., Hamilton, OH (US)

(72) Inventors: Rick Alan Pollard, Moscow, OH (US); Bryan Keith Allen, Lebanon, OH (US); Chow-Chi Huang, West Chester, OH (US); Gene Michael Altonen, West Chester, OH (US)

(73) Assignee: IMFLUX INC., Hamilton, OH (US)

( * ) Notice: Subject to any disclaimer, the term of this patent is extended or adjusted under 35 U.S.C. 154(b) by 0 days.

(21) Appl. No.: 16/134,405

(22) Filed: Sep. 18, 2018

(65) Prior Publication Data
US 2019/0017886 A1 Jan. 17, 2019

Related U.S. Application Data

(62) Division of application No. 15/615,996, filed on Jun. 7, 2017, now Pat. No. 10,107,697.
(Continued)

(51) Int. Cl.
G01L 1/22 (2006.01)
B29C 45/77 (2006.01)
(Continued)

(52) U.S. Cl.
CPC ........ G01L 1/2218 (2013.01); B29C 45/2708 (2013.01); B29C 45/30 (2013.01);
(Continued)

(58) Field of Classification Search
CPC ....... G01L 1/2218; G01L 1/04; G01L 19/147; G01L 5/161; G01F 1/05; G01N 11/08;
(Continued)

(56) References Cited

U.S. PATENT DOCUMENTS 5,144,843 A 9/1992 Tamura et al.
6,514,440 B1 2/2003 Kazmer et al.
(Continued)

FOREIGN PATENT DOCUMENTS

DE 69308539 T2 10/1997
DE 198820439 T1 1/2000
(Continued)

OTHER PUBLICATIONS

International Search Report and Written Opinion, International Application No. PCT/US2017/036284, dated Aug. 21, 2017.

Primary Examiner — Octavia Hollington
(74) Attorney, Agent, or Firm — Marshall, Gerstein & Borun LLP

(57) ABSTRACT

A strain gauge nozzle adapter that may be placed between a barrel end cap and a nozzle body of an injection molding system, the strain gauge nozzle adapter having a strain gauge pin that measures strain within the strain gauge nozzle adapter for use in approximating conditions within an injection molding system, such as pressure or the location of a melt flow front. The strain gauge nozzle adapter may include a plurality of strain gauge pins. An alternative material insert in the strain gauge nozzle adapter may surround a strain gauge pin to amplify meaningful measurements obtained by the strain gauge pin so that noise measurements do not compromise the accuracy of approximation of conditions within a mold.

6 Claims, 8 Drawing Sheets

Related U.S. Application Data

(60) Provisional application No. 62/356,638, filed on Jun. 30, 2016.

(51) Int. Cl.
*G01L 19/14* (2006.01)
*B29C 45/27* (2006.01)
*B29C 45/30* (2006.01)
*G01L 1/04* (2006.01)
*B29C 45/16* (2006.01)

(52) U.S. Cl.
CPC ............... *B29C 45/77* (2013.01); *G01L 1/04* (2013.01); *G01L 19/147* (2013.01); *B29C 45/1603* (2013.01); *B29C 2945/7619* (2013.01); *B29C 2945/76381* (2013.01); *B29C 2945/76481* (2013.01); *B29C 2945/76498* (2013.01); *B29C 2945/76545* (2013.01); *B29C 2945/76658* (2013.01); *B29C 2945/76859* (2013.01)

(58) Field of Classification Search
CPC ............... B29C 45/77; B29C 45/1603; B29C 2945/7619; B29C 2945/76381; B29C 2945/76481; B29C 2945/76498; B29C 2945/76545; B29C 2945/76658; B29C 2945/76859

USPC .................................................. 73/862.045
See application file for complete search history.

(56) References Cited

U.S. PATENT DOCUMENTS

| | | | |
|---|---|---|---|
| 9,097,565 | B2 | 8/2015 | Beaumont et al. |
| 9,289,933 | B2 | 3/2016 | Altonen et al. |
| 10,107,697 | B2 * | 10/2018 | Pollard ............... B29C 45/2708 |
| 2011/0254183 | A1 | 10/2011 | Maris-Haug et al. |
| 2012/0329948 | A1 * | 12/2012 | Altonen ................. B29C 45/77 525/56 |
| 2015/0084221 | A1 | 3/2015 | Oomori |
| 2018/0001531 | A1 | 1/2018 | Lawless, III et al. |
| 2018/0003575 | A1 | 1/2018 | Pollard et al. |

FOREIGN PATENT DOCUMENTS

| | | |
|---|---|---|
| DE | 102008040955 A1 | 2/2010 |
| FR | 2621525 A1 | 4/1989 |
| JP | H05329864 A | 12/1993 |
| JP | 2001079886 A | 3/2001 |
| WO | WO-97/13132 A1 | 4/1997 |

* cited by examiner

UPSTREAM NOZZLE SENSOR FOR INJECTION MOLDING APPARATUS AND METHODS OF USE

CROSS-REFERENCE TO RELATED APPLICATION

This application is a divisional of U.S. patent application Ser. No. 15/615,996, filed Jun. 7, 2017, which claims the benefit of the filing date under 35 USC § 119(e), of U.S. Provisional Application No. 62/356,638, filed on Jun. 30, 2016. The priority applications, U.S. Ser. No. 15/615,996 and U.S. 62/356,638, are hereby incorporated by reference in their entireties.

FIELD OF THE DISCLOSURE

This application relates generally to injection molding and, more specifically, to an upstream strain gauge nozzle adapter for use in an injection molding process to amplify and sense a condition, such as strain, experienced by the nozzle over the course of the injection molding process, the sensed condition then usable to approximate other conditions, such as pressure or melt flow front position, within a downstream injection mold cavity for purposes of determining whether adjustments should be made to the injection molding process.

BACKGROUND

During injection molding, thermoplastic pellets are fed by a hopper into a heated barrel and driven to the end of the heated barrel by a reciprocating screw. The thermoplastic pellets melt into a molten thermoplastic material, and shots of thermoplastic material are extruded through a nozzle. The molten thermoplastic material then flows through runners to the gate of a mold. After entering the gate, the molten thermoplastic material fills a mold cavity formed between two or more sides of the mold.

The pressure within the mold cavity is an important vector, as insufficient pressure may result in improperly formed parts while excessive pressure may result in damage to the mold. The pressure at the melt flow front provides information relevant to the injection molding process overall by, for example, enabling calculation of how fast a mold cavity is filling and how long cooling of the molded part within the cavity is likely to take. Some injection molding processes aim to have the melt flow front follow a particular pressure pattern over time in order to optimize the injection molding process. For example, some injection molding processes maintain a pressure balance between the air pressure in the cavity, which changes based on the mold cavity geometry as the molten thermoplastic material moves into the cavity of the mold, and the pressure at the melt flow front, in order to produce a final product that is fully relieved of internal stresses that would otherwise undesirably lead to shrink, sink and warpage. For such injection molding systems, determining the real-time pressure at the melt flow front is important in order to determine whether the desired pressure/time curve is properly being followed and, if deviations from the pressure/time curve are identified, to make adjustments to correct the pressure of the melt flow front.

One particular motivation to monitor flow front position and/or control internal pressure at certain times during the short duration of filling of a mold cavity is to account for flow filling challenges. The term "flow filling challenge" is defined as a region of a part of a mold that forms a feature of a part to be molded which is particularly susceptible to any one or more of a number of problems that complicate the molding of the part or render the molded part more likely to suffer from one or more defects or reduced mechanical properties, such as short-fills, warp, sinks, brittleness, flash, voids, non-fills, weakness (e.g., low tensile, torsional, and/or hoop strength), high stress concentrations, low modulus, reduced resistance to chemical exposure, premature fatigue, non-uniform shrinkage, and discontinuities in color, surface texture, opacity, translucency, or transparency. Non-exhaustive examples of flow filling challenges are: Locations in a mold used to form ribs, bosses, or corners, as well as obstacles in a mold (such as core pins), and transitions (such as a change in thickness of a part to be molded, which may be a sudden stepped change in thickness or a gradual change in thickness, such as a tapered region). These can involve a transition from a relatively thick region to a relatively thin region, and then back to a relatively thick region, and may involve one or more changes in thickness. The portion of a mold cavity used to form a living hinge, which is typically an integral, relatively thin region of a molded part that permits one portion of the part, such as a flip-top of a cap, to rotate with respect to the rest of the part, poses a flow filling challenge. As the term flow filling challenge is used herein, it is contemplated that the region of the part affected by a particular challenge may be at a particular position of a mold cavity, along a region of a mold cavity, or downstream of a particular position or region of a mold cavity, and as such, a flow filling challenge need not be limited to a particular location of a change in shape of a mold cavity, but may extend beyond, i.e. downstream of, such a location.

Ideally, sensors for measuring the pressure within a mold cavity and at a melt flow front would be indirect, easy to install, and inexpensive. Direct sensors, such as sensors placed within a mold cavity, leave undesirable marks on part surfaces. For example, while demand for injection molded parts with high gloss finishes has been increasing, direct sensors positioned in the mold cavity have a tendency to mar the high gloss finish of the parts. As a result, indirect sensors that are not located in the mold cavity are preferable. Additionally, when the molding system is being used to make products for medical applications, contact between a sensor and the thermoplastic material may be prohibited. Some current indirect sensors include parting line sensors, ejector or static pin sensors, and ultrasonic sensors. Unfortunately, these indirect sensors cannot always be placed in optimal locations, sometimes require that a mold apparatus undergo a period of downtime in order to be machined so that the sensor can be mounted, and can be expensive. Strain gauge sensors have been used in the past in conjunction with molding apparatuses having ejector sleeves or long core pins, but not all injection molding apparatuses are configured to include an ejector sleeve or long core pin.

More recently, external sensors, such as strain gauges, have been placed on a mold surface in order to measure how a condition, such as strain, changes over the course of a standard injection molding process. In a typical injection molding apparatus, a mold cavity is formed between two mold sides, which are held together under pressure by a press or clamping unit. Thus, along the parting line of the mold, a closing force is exerted by the press or clamping unit. When molten thermoplastic material is injected into the mold cavity, the molten thermoplastic material exerts an opening force along the parting line of the mold. Ideally, the opening force exerted by the molten thermoplastic material is less than the closing force exerted by the clamping unit. If the opening force is greater than the closing force, the mold sides are forced apart and flashing, or leakage of the molten thermoplastic material, occurs. A strain gauge sensor placed on the exterior of the mold surface adjacent to a parting line of a mold is able to sense the surface strain changes on the mold surface that occur over time as a result of the closing and opening forces. In response to surface strain changes, the strain gauge sensor emits an electrical signal, typically in the range of −10 to 10 Volts. The signal emitted by the strain gauge sensor is received and used by a controller to approximate one or more conditions within the mold, such as the pressure within the mold cavity or the location of the melt flow front. In certain molds in which the ratio of the length of the flow channel to the thickness of the molded part is great, i.e. molds having a high length-to-thickness (L/t) ratio, the pressure at the melt flow front may be approximated based on the signals emitted by the strain gauge sensor(s). These approximations may be useful for adjusting the injection molding process. For example, the amount of pressure within the mold cavity may be approximated and compared to a maximum permissible mold cavity pressure in an effort to ensure that the mold cavity is not damaged by excessive mold cavity pressure.

However, two key challenges make it difficult to approximate a condition within a mold cavity using an external sensor, such as a strain gauge, placed on a mold surface. First, not all areas of a mold surface experience a measurable condition, such as strain, in a way that accurately, reliably, and/or quantifiably corresponds with a condition within the mold, such as the pressure within the mold cavity or the location of the melt flow front, and therefore only some areas of a mold surface can be used to approximate one or more conditions within the mold, such as the pressure within the mold cavity or the location of the melt flow front. Injection molds come in a variety of shapes and sizes. Identifying areas of a mold surface that can be used to approximate a condition within the mold using an external strain gauge sensor has required testing a number of different areas on the mold surface, which can be time consuming, or making a blind guess that may turn out to be wrong. Second, even in areas on the surface mold that do experience a condition, such as strain, in a way that corresponds with a condition within the mold, external sensors often pick up some amount of "noise" generated during the molding process that does not correspond with a condition within the mold cavity. The noise measurements picked up by the external sensor must be distinguished from the meaningful measurements in order to accurately approximate one or more conditions within the mold. In some cases, the ratio of noise measurements to meaningful measurements is so high that conditions within the mold cannot be accurately approximated.

SUMMARY

Embodiments within the scope of the present disclosure are directed to a sensor located in an adapter of a nozzle of an injection molding system in order to approximate conditions within a mold, such as pressure or the location of a melt flow front. Strain gauge sensors are the type of sensor primarily discussed, while other sensors capable of detecting movement of the nozzle as a proxy or tell-tale for internal conditions such as mold cavity pressure or flow front location, could achieve the same purpose as a strain gauge sensor and are within the scope of the present disclosure. For example, microwave sensor kits, x-ray sensor kits, ultrasonic sensor kits, air pressure sensor kits, air temperature sensor kits, and sub-surface temperature sensor kits, could all be substituted for the strain gauge sensors described and depicted below. Additionally, other types of external gauge sensors, such as electrical, electronic, mechanical, wireless, and fiber optic sensors, could be utilized instead of strain gauge sensors.

The present disclosure is directed to a strain gauge nozzle adapter for use in injection molding systems. The strain gauge nozzle adapter is positioned between the barrel end cap and a nozzle tip of the injection molding system and allows molten thermoplastic material to flow through it. The strain created in the strain gauge nozzle adapter by the flowing molten thermoplastic material is measured by at least one strain gauge pin located in a strain gauge aperture that extends from an external wall of the adapter to a bottom located a minimum distance away from an internal wall of the melt flow conduit. Depending on the orientation and type of strain sensor(s), the strain may be linear strain along one or more axes or circumferential strain in one or more locations. In some embodiments within the scope of the present disclosure, the strain gauge aperture may be located in an alternative material insert that amplifies the strain experienced by the strain gauge nozzle adapter. The alternative material insert may have a lower flex modulus than the surrounding strain gauge nozzle adapter. For example, the alternative material insert may be made of brass or aluminum while the strain gauge nozzle adapter is made from steel. In some embodiments within the scope of the present disclosure, the injection molding system may also include one or more secondary sensor. Each strain gauge pin and each secondary sensor is connected to a controller, which is connected to a virtual cavity sensor that calculates data such as mold cavity pressure and optionally adjusts the injection molding process based on the strain information received.

BRIEF DESCRIPTION OF THE DRAWINGS

While the specification concludes with claims particularly pointing out and distinctly claiming the subject matter that is regarded as the present disclosure, it is believed that the disclosure will be more fully understood from the following description taken in conjunction with the accompanying drawings. Some of the figures may have been simplified by the omission of selected elements for the purpose of more clearly showing other elements. Such omissions of elements in some figures are not necessarily indicative of the presence or absence of particular elements in any of the exemplary embodiments, except as may be explicitly delineated in the corresponding written description. None of the drawings are necessarily to scale.

DETAILED DESCRIPTION OF THE INVENTION

Figure 1:
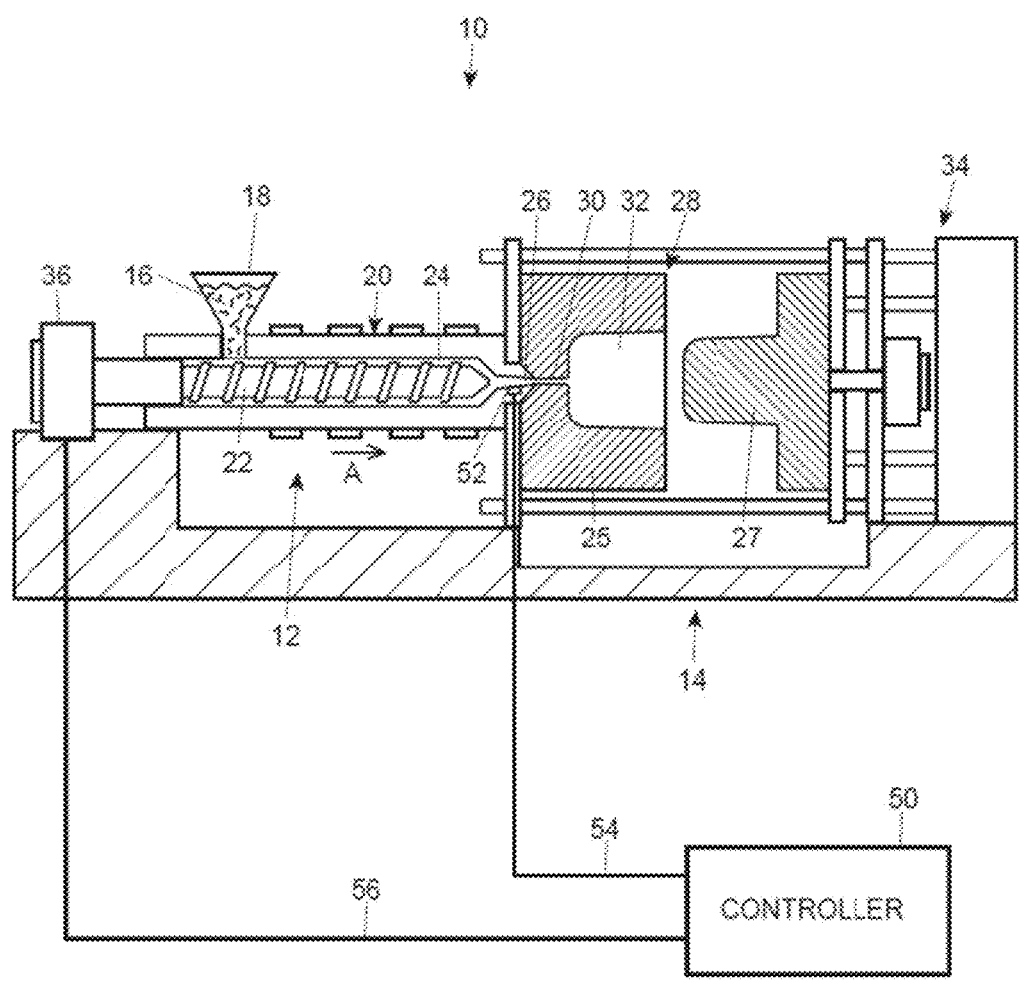
FIG. 1 is a front elevation view of an injection molding system.

Referring to the figures in detail, FIG. 1 illustrates an exemplary injection molding apparatus 10 for producing thermoplastic parts in high volumes (e.g., a class 101 injection mold, or an "ultra-high productivity mold", a class 102 (medium-to-high productivity mold), or class 103 (a medium productivity mold)). The injection molding apparatus 10 generally includes an injection system 12 and a clamping system 14. A thermoplastic material may be introduced to the injection system 12 in the form of thermoplastic pellets 16. The thermoplastic pellets 16 may be placed into a hopper 18, which feeds the thermoplastic pellets 16 into a heated barrel 20 of the injection system 12. The thermoplastic pellets 16, after being fed into the heated barrel 20, may be driven to the end of the heated barrel 20 by a ram, such as a reciprocating screw 22. The heating of the heated barrel 20 and the compression of the thermoplastic pellets 16 by the reciprocating screw 22 causes the thermoplastic pellets 16 to melt, forming a molten thermoplastic material 24. The molten thermoplastic material is typically processed at a temperature of about 130° C. to about 410° C.

The reciprocating screw 22 forces the molten thermoplastic material 24, toward a nozzle 26 to form a shot of thermoplastic material, which will be injected into a mold cavity 32 of a mold 28 via one or more gates. A check ring 38 is provided within the barrel toward a tip end of the reciprocating screw 22. The check ring 38 is coupled (e.g., attached) to a portion of the reciprocating screw 22, preferably at a position proximate a tip end of the screw 22. The check ring 38 is generally configured to prevent, or at least limit, a backflow of molten thermoplastic material 24 from flowing in a direction from the nozzle 26 toward the hopper 18. The molten thermoplastic material 24 may be injected through a gate 30, which directs the flow of the molten thermoplastic material 24 to the mold cavity 32. In other embodiments the nozzle 26 may be separated from one or more gates 30 by a feed system (not shown). The mold cavity 32 is formed between first and second mold sides 25, 27 of the mold 28 and the first and second mold sides 25, 27 are held together under pressure by a press or clamping unit 34. The press or clamping unit 34 applies a clamping force during the molding process that is greater than the force exerted by the injection pressure acting to separate the two mold halves 25, 27, thereby holding the first and second mold sides 25, 27 together while the molten thermoplastic material 24 is injected into the mold cavity 32. In a typical high variable pressure injection molding machine, the press typically exerts 30,000 psi or more because the clamping force is directly related to injection pressure. To support these clamping forces, the clamping system 14 may include a mold frame and a mold base.

Once the shot of molten thermoplastic material 24 is injected into the mold cavity 32, the reciprocating screw 22 stops traveling forward. The molten thermoplastic material 24 takes the form of the mold cavity 32 and the molten thermoplastic material 24 cools inside the mold 28 until the thermoplastic material 24 solidifies. Once the thermoplastic material 24 has solidified, the clamping unit 34 releases the first and second mold sides 25, 27, the first and second mold sides 25, 27 are separated from one another, and the finished part may be ejected from the mold 28. The mold 28 may include a plurality of mold cavities 32 to increase overall production rates. The shapes of the cavities of the plurality of mold cavities may be identical, similar or different from each other. (The latter may be considered a family of mold cavities).

Figure 2:
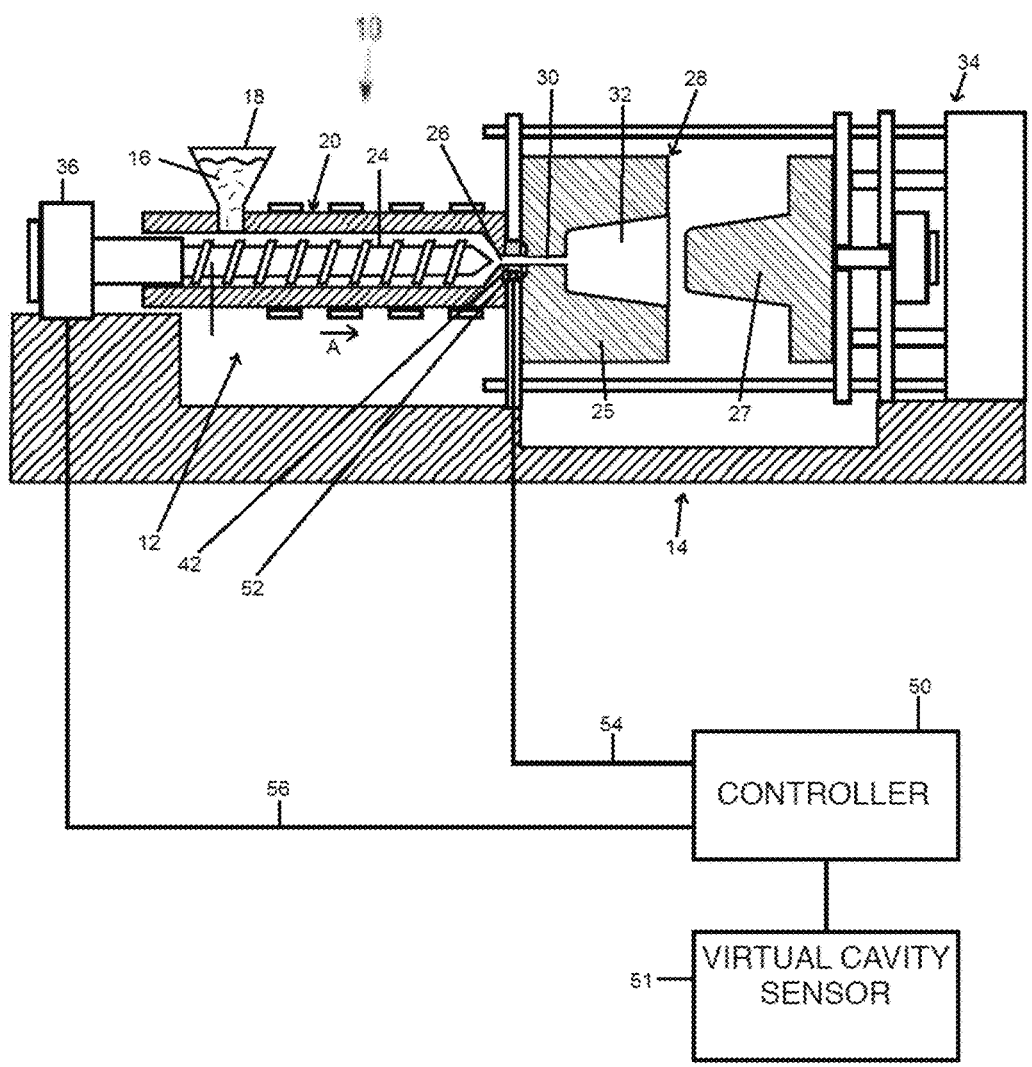
FIG. 2 is a front elevation view of an injection molding system including a strain gauge nozzle adapter of the present disclosure including a single strain gauge pin.

FIG. 2 illustrates an injection molding system 10 of the present disclosure that includes a strain gauge nozzle adapter 42 and strain gauge pin 52. A controller 50 is communicatively connected with a strain gauge pin 52 and a screw control 36. The strain gauge pin 52 is located on in a strain gauge adapter 42, discussed in greater depth with respect to FIG. 3. The controller 50 may include a microprocessor (or another suitable processing unit, or several such units), a non-transitory memory, and one or more communication links.

The strain gauge pin 52 senses strain experienced by the strain gauge nozzle adapter 42. Data from the strain gauge pin 52 may be communicated to a processor that calculates the change in the strain of the strain gauge nozzle adapter 42. Electric signals 54 from the strain gauge pin 52 may travel along one or more electrical paths, such as wires 54, depicted in FIG. 1 in solid lines, ranging in strength from −10 to 10 Volts. The controller 50 may be connected to the screw control 36 via wired connection 56. In other embodiments, the controller 50 may be connected to the screw control 36 via a wireless connection, a mechanical connection, a hydraulic connection, a pneumatic connection, or any other type of communication connection known to those having ordinary skill in the art that will allow the controller 50 to communicate with the screw control 36.

The controller 50 may use the change in strain calculated from the information provided by the strain gauge pin 52 to approximate conditions, such as pressure or melt flow front position, within the mold cavity or, in certain molds, particularly in which the ratio of the length of the flow channel to the thickness of the molded part is large, at the melt flow front of the molten thermoplastic material 24. These approximations may then be used to adjust the injection molding process. For example, the amount of pressure within the mold cavity 32 may be approximated and compared to a maximum permissible mold cavity pressure in order to ensure that the mold cavity 32 is not damaged by excessive mold cavity pressure. If the amount of pressure within the mold cavity 32 is approximated to be dangerously close to the maximum permissible mold cavity pressure, or even in excess of a safety threshold well below the maximum permissible mold cavity pressure, the controller 50 may direct the screw control 36 to cease injecting molten thermoplastic material. Other approximations may be used to control the molding process, such that variations in material viscosity, mold temperatures, melt temperatures, and other variations influencing filling rate, can be used to trigger adjustments to the injection molding system by the controller 50. These adjustments may be made immediately during the molding cycle, or corrections can be made in subsequent cycles. Furthermore, the approximations may be averaged over a number of cycles and then used to make adjustments to the molding process by the controller 50.

Additionally, the controller 50 is in communication with a virtual cavity sensor 51, which is implemented as a program, or a set of software instructions. More generally, however, a virtual cavity sensor can be implemented in hardware (e.g., as an application-specific integrated circuit (ASIC)), firmware, software, or any suitable combination thereof. In this disclosure, the term "virtual cavity sensor" can refer to a module that determines the value of a process variable, such as pressure, without directly measuring this process variable. For purposes of this application, determines" means "compares the signal indicative of the output from each external sensor to a stored database that correlates that signal value to an approximate pressure or melt flow front location and outputs a signal indicative of that approximate pressure or melt flow front location corresponding to the external sensor signal value." The strain gauge pin 52 and the virtual cavity sensor 51 together form a pressure controlling system that generates data relevant to strategic controlling of the pressure within the mold cavity 32. As used herein, the term "pressure controlling system" refers to any suitable group of components, which can include both software-implemented and hardware-implemented components, that generate a signal indicative of a condition within a mold cavity based on a signal indicative of another process variable.

For example, if based on the strain information provided by the strain gauge sensor 52, a processor associated with the controller 50 determines that pressure within the mold cavity exceeds a trigger point (or is outside of a predetermined acceptable range), the virtual cavity sensor 51 signals the controller to adjust the screw control 36 to bring the pressure within the mold cavity back to a level below the trigger point (or within the predetermined acceptable range). As another example, if based on the strain information provided by the strain gauge sensor 52, a processor associated with the controller 50 detects that changes in plastic pressure have progressed beyond a trigger point (which may correlate to a percentage of the mold that has been filled), the virtual cavity sensor 51 signals the controller to adjust the screw control 36 to bring the pressure within the mold cavity to a predetermined acceptable finalizing pressure or range, which may involve a reduction in pressure to avoid overpacking a mold cavity, and thereby prevent unwanted flashing.

Figure 3:
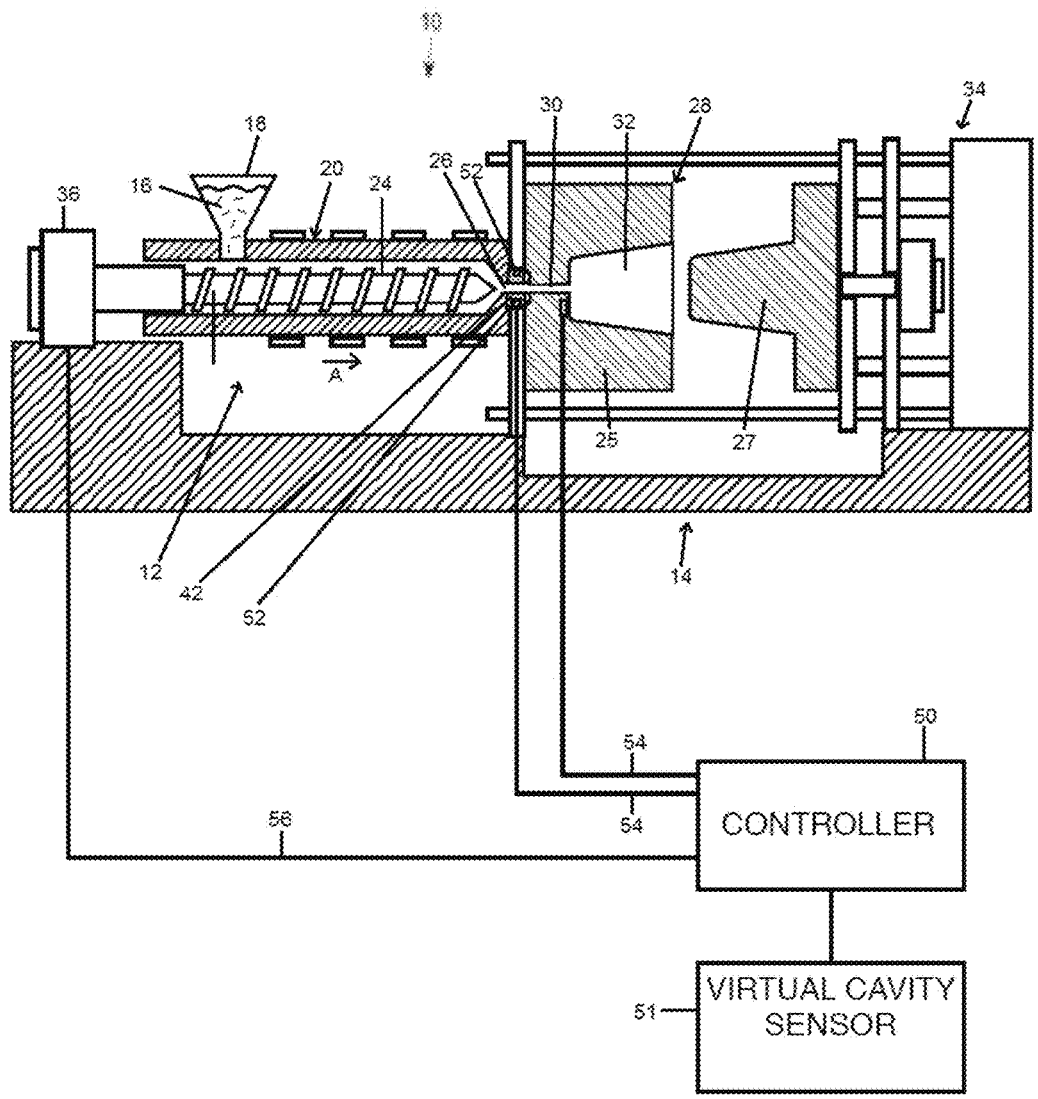
FIG. 3 is a front elevation view of an injection molding system including a strain gauge nozzle adapter of the present disclosure including multiple strain gauge pins in the strain gauge nozzle adapter and a secondary sensor.

FIG. 3 illustrates an injection molding system 10 having a strain gauge nozzle adapter 42 with multiple strain gauge pins 52. In the embodiment depicted in FIG. 3, the strain gauge nozzle adapter 42 has two strain gauge pins 52 arranged in the same circumferential plane, both of which are connected to the controller 50. In other embodiments within the scope of this disclosure, more than two strain gauge pins 52 may be included in the strain gauge nozzle adapter 42 and their location may be spread out along the length of the strain gauge nozzle adapter 42. FIG. 3 also depicts the injection molding system 10 including a secondary sensor 76. The secondary sensor 76 is depicted as a pressure sensor in the mold cavity 32, but in other embodiments within the scope of the present disclosure, the sensory sensor 76 may be another type of sensor, such as a strain gauge sensor, and may be located in another location. In addition, more than one secondary sensor 76 may be connected to the controller 50. The controller 50 provides the signals received from the strain gauge pins 52 and any secondary sensor 76 to the virtual cavity sensor 51.

Figure 4:
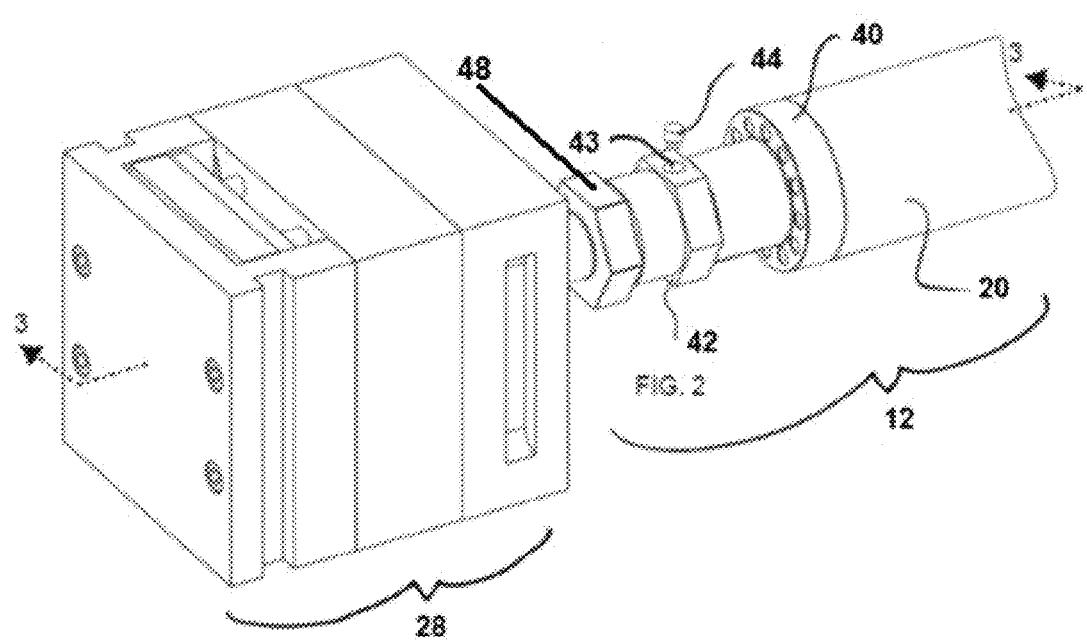
FIG. 4 is an orthogonal view of a portion of an injection system and a mold assembly of an injection molding system, illustrating (exploded from the injection system) a porous metal insert and strain gauge pin for use in a strain gauge nozzle adapter of the injection system.

Turning to FIG. 4, a region of the injection molding apparatus 10 of the present disclosure is illustrated, with the mold 28 at the lower left and a portion of the injection system 12 at the upper right in the drawing figure. The heated barrel 20 is provided with a barrel end cap 40. A strain gauge nozzle adapter 42 projects from the barrel end cap 40. A strain gauge aperture 43 is provided in the strain gauge nozzle adapter 42. The strain gauge aperture 43 receives a strain gauge 44 therein, which is secured by friction fit in the embodiment depicted. In other embodiments, the strain gauge 44 may be secured in place by screwing a screw into the walls of strain gauge aperture above the strain gauge 44. While a single strain gauge aperture 43 is illustrated, it is understood that the strain gauge nozzle adapter 42 may be provided with a plurality of strain gauge apertures 43, each having a strain gauge 44 secured therein as discussed above.

The strain gauge nozzle adapter 42 is provided between a barrel end cap 40 and a nozzle body 48 having a nozzle provided at an end thereof. While the embodiments illustrated in the drawings show the strain gauge nozzle adapter 42 as a distinct component from the strain gauge nozzle body 48, the strain gauge nozzle adapter 42 is considered part of what is referred to herein as the nozzle assembly, and could be formed integrally with the nozzle body 48 and still be considered within the scope of the appended claims. The nozzle body 48 is in fluid communication with at least one of the mold cavity 32, a gate, a runner, or a manifold of the injection molding system.

Figure 5:
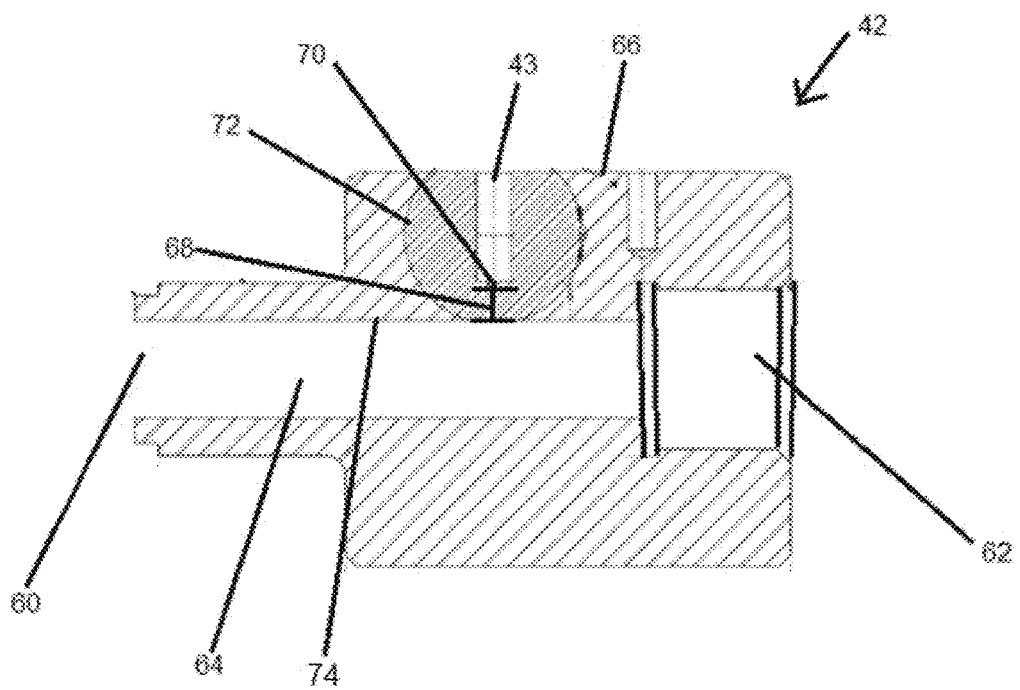
FIG. 5 is a longitudinal cross-sectional view of a strain gauge nozzle adapter of the present disclosure.

FIG. 5 illustrates a cross-sectional view of an embodiment of a strain gauge nozzle adapter 42 of the present disclosure. The strain gauge nozzle adapter 42 includes a melt flow inlet 60, a melt flow outlet 62, and a melt flow conduit 64 extending between the inlet 60 and outlet 64. The strain gauge aperture 43 is provided on an external melt flow conduit wall 66. In some embodiments, the longitudinal axis of strain gauge aperture 43 is perpendicular to the axis of the melt flow conduit 64. A minimum distance 68 must be maintained between the bottom 70 of the strain gauge aperture 43 and an internal melt flow conduit wall 74 to avoid cracking or leaking through the internal melt flow conduit wall 66. In some embodiments within the scope of the present disclosure, the minimum distance 68 is 0.5 mm.

Figure 6:
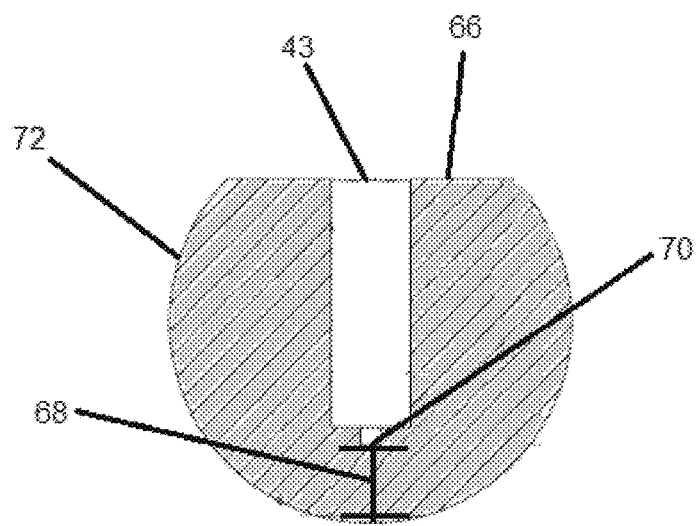
FIG. 6 is an enlarged view of the strain gauge pin aperture depicted in the cross-sectional view of a strain gauge nozzle adapter of FIG. 3.

In some embodiments within the scope of the present disclosure, the strain gauge aperture may be formed in an alternative material insert 72 that is made of a different material than the rest of the strain gauge nozzle adapter 42. An expanded view of an alternative material insert 72 is depicted in FIG. 6. In some embodiments, the strain gauge nozzle adapter 42 is made from stainless, pre-treated steel while the alternative material insert 72 is made from aluminum, brass, or another material that will better amplify the strain for detecting by the strain gauge pin 44. In some embodiments, the alternative metal insert is formed from a modified metallurgy that expands at the same rate as steel. The minimum distance 68 may vary depending upon the material forming the alternative material insert.

Figure 7:
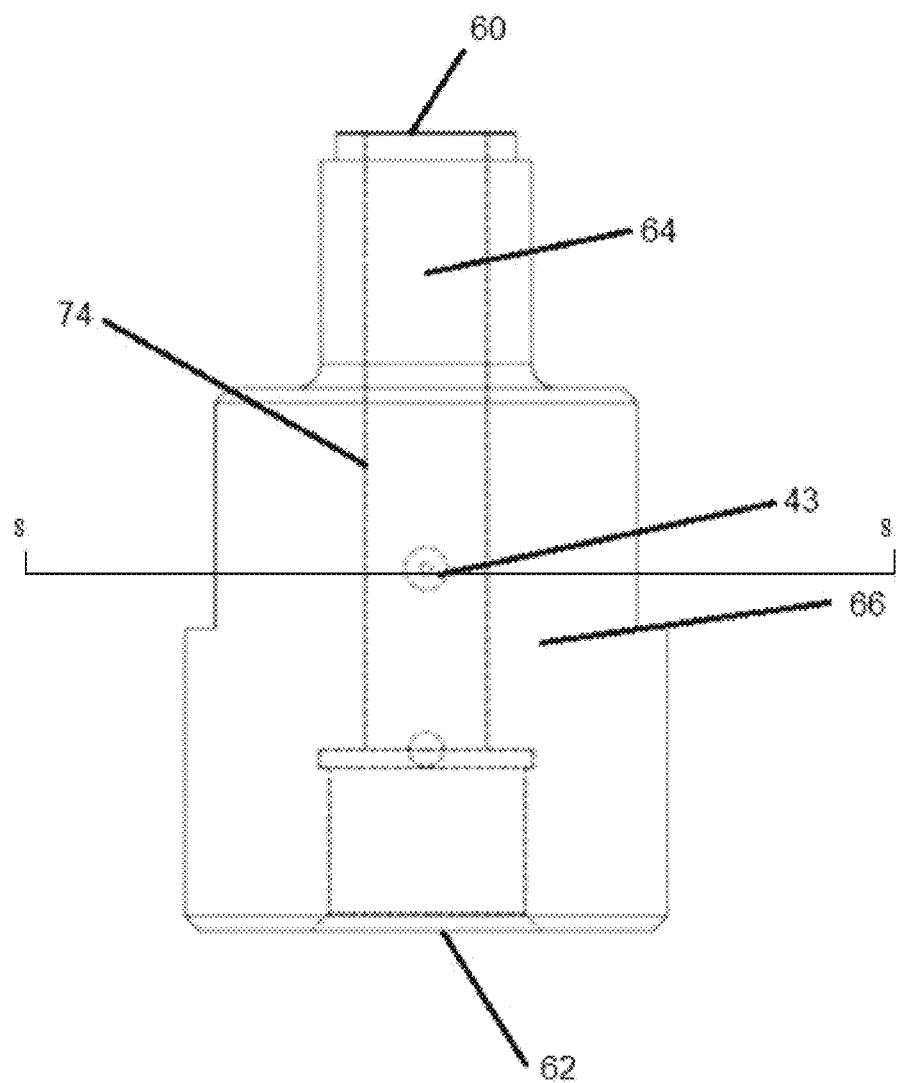
FIG. 7 is a top view of a strain gauge nozzle adapter of the present disclosure.
Figure 8:
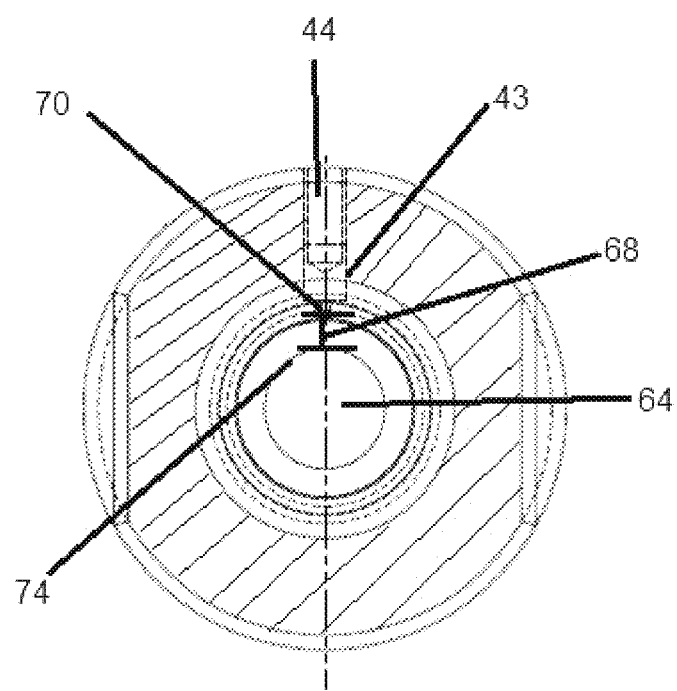
FIG. 8 is a cross-sectional view taken along lines 8-8 in FIG. 7 of a strain gauge nozzle adapter of the present disclosure.

FIG. 7 illustrates a top view of a strain gauge nozzle adapter 42. One of the benefits of a strain gauge nozzle adapter 42 is that it is easily compatible with various injection molding systems without the need for modifications to the injection molding systems. For example, most injection molding systems may be connected to the melt flow inlet 60 and melt flow outlet 62 of the strain gauge nozzle adapter 42 by a universal thread. FIG. 8 provides a cross-sectional view of the strain gauge nozzle adapter 42 depicted in FIG. 6. The strain gauge pin 44 described in the present application could be chosen from a variety of commercially available strain gauge sensors. For example, the Kistler "Miniature Longitudinal Measuring Pin M5"

Type 9247A would be suitable for use in embodiments within the scope of the present invention.

Figure 9:
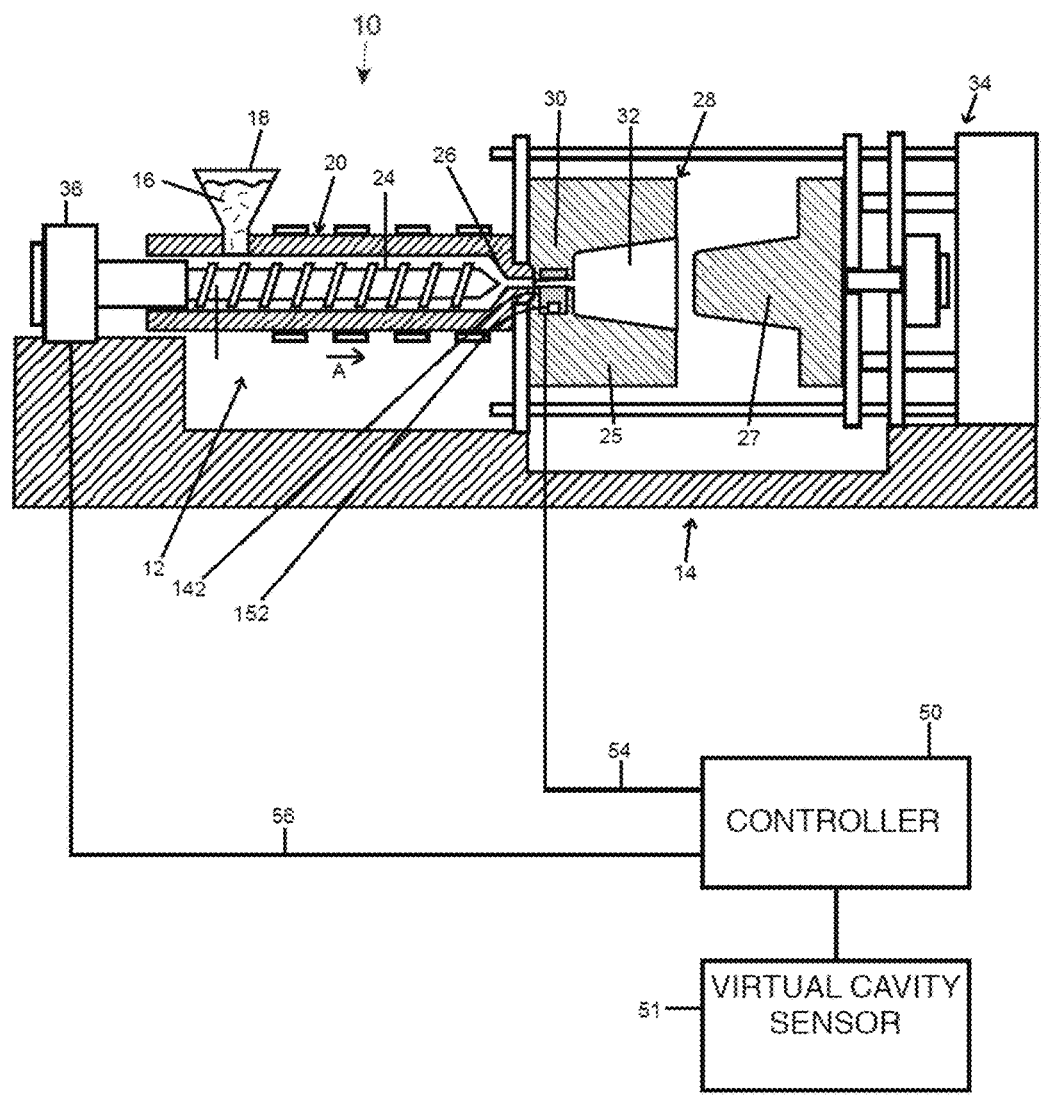
FIG. 9 is a front elevation view of an injection molding system including a strain gauge feed system adapter of the present disclosure.

FIG. 9 illustrates an injection molding system 10 having a strain gauge feed system adapter 142 with a strain gauge pin 152. The strain gauge feed system adapter 142 works identically to the strain gauge nozzle adapter 42 discussed with respect to FIG. 2, except that strain is experienced by the strain gauge feed system adapter 142 and measured by the strain gauge pin 152 at a location along the feed system of the injection molding system 10 rather than at the nozzle 26. Specifically, the strain gauge feed system adapter 142 may be attached to the injection molding system 10 between the nozzle 26 and the mold 28.

A person having skill in the art would recognize that many of the features provided in a strain gauge nozzle adapter 42 could also be provided in a strain gauge feed system adapter 142. The strain gauge feed adapter 142 may include an aperture for the strain gauge pin 152, and an alternative material insert may surround the aperture and amplify the strain experienced by the strain gauge feed system adapter. The alternative material insert may have a lower flex modulus than the surrounding external sensor feed system adapter, and the alternative material insert may be one of aluminum and brass. The aperture of the strain gauge feed system adapter has a bottom, and the strain gauge nozzle adapter may have a melt flow conduit having an internal melt flow conduit wall. The distance between the bottom of the aperture and an internal melt flow conduit wall may be a minimum distance necessary to prevent cracking or leakage, such as 0.5 mm.

The strain gauge feed system adapter 142 may have a plurality of strain gauge pins 152 provided in a plurality of apertures, and the controller may determine at least one of an approximate pressure or melt flow front location using an output of each strain gauge pin and adjust the operation of the ram in view of the determined approximate pressure or melt flow front location. The plurality of apertures may be located in the same circumferential plane of the strain gauge feed system adapter. In some embodiments within the scope of the present disclosure, a secondary sensor may be used in conjunction with the strain gauge feed system adapter 142. The controller may determine at least one of an approximate pressure or melt flow front location using an output of the strain gauge pin and the secondary sensor, and the injection molding apparatus 10 adjusts an operation of the ram in view of the determined approximate pressure or melt flow front location.

The strain gauge feed system adapter may be used in a method of injection molding. The method may include measuring, using a strain gauge pin, the change in strain in a strain gauge feed system adapter. The method may further include approximating at least one of a pressure or a melt flow front location within the mold cavity based on the change in strain and comparing the approximated pressure or melt flow front location to a trigger point. If the approximated pressure or melt flow front location equals or exceeds the trigger point, the method may include activating a virtual cavity sensor, wherein upon activation, the virtual cavity sensor causes a controller to perform an action.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of injection molding, comprising:
measuring, using a strain gauge pin, a change in strain in a strain gauge nozzle adapter;
approximating at least one of a pressure or a melt flow front location within a mold cavity based on the change in strain;
comparing the approximated pressure or melt flow front location to a trigger point; and,
if the approximated pressure or melt flow front location equals or exceeds the trigger point, activating a virtual cavity sensor, wherein upon activation, the virtual cavity sensor causes a controller to perform an action, the method further comprising amplifying a change in an alternative material insert of the strain gauge nozzle adapter.

2. The method of injection molding of claim 1, wherein measuring the change in strain in a strain gauge nozzle adapter includes using a plurality of strain gauge pins.

3. The method of injection molding of claim 1, wherein measuring the change in strain in a strain gauge nozzle adapter includes using a secondary sensor.

4. A method of injection molding, comprising:
measuring, using a strain gauge pin, a change in strain in a strain gauge feed system adapter;
approximating at least one of a pressure or a melt flow front location within a mold cavity based on the change in strain;
comparing the approximated pressure or melt flow front location to a trigger point; and,
if the approximated pressure or melt flow front location equals or exceeds the trigger point, activating a virtual cavity sensor, wherein upon activation, the virtual cavity sensor causes a controller to perform an action, the method further comprising amplifying a change in an alternative material insert of the strain gauge feed system adapter.

5. The method of injection molding of claim 4, wherein measuring the change in strain in a strain gauge feed system adapter includes using a plurality of strain gauge pins.

6. The method of injection molding of claim 4, wherein measuring the change in strain in a strain gauge feed system adapter includes using a secondary sensor.

* * * * *